United States Patent
Canto Maya et al.

(10) Patent No.: US 12,447,515 B2
(45) Date of Patent: Oct. 21, 2025

(54) SYSTEM AND METHOD FOR DEPLOYING VOLATILE CORROSION INHIBITOR TO PROTECT AGAINST SOIL SIDE CORROSION AT THE BOTTOM OF A STORAGE TANK

(71) Applicant: Saudi Arabian Oil Company, Dhahran (SA)

(72) Inventors: Christian Canto Maya, Dhahran (SA); Hasan Ali Al-Hashmy, Dhahran (SA); Hassan Alshahdood, Dhahran (SA); Shaker Janabi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1159 days.

(21) Appl. No.: 17/348,178

(22) Filed: Jun. 15, 2021

(65) Prior Publication Data
US 2022/0395879 A1    Dec. 15, 2022

(51) Int. Cl.
*C23F 1/00* (2006.01)
*B08B 5/00* (2006.01)
(Continued)

(52) U.S. Cl.
CPC ............... *B09C 1/08* (2013.01); *B65D 90/22* (2013.01); *C23F 11/08* (2013.01)

(58) Field of Classification Search
CPC ........ B65D 90/22; B65D 81/24; B65D 59/04; C10G 75/00; C23F 11/00; E02D 27/38; E04H 7/04; E04H 7/00
(Continued)

(56) References Cited

U.S. PATENT DOCUMENTS 4,275,835 A * 6/1981 Miksic .................... C23F 11/02
428/305.5
5,096,087 A    3/1992 Thomas
(Continued)

FOREIGN PATENT DOCUMENTS

CN    110172702 A    8/2019
CN    210176957 U    3/2020
(Continued)

OTHER PUBLICATIONS

Lyublinski, Efim, et al. "Corrosion Inhibitors for Long-Term Protection of Enclosures." CORROSION 2013. NACE International, 2013. 8 pages.
(Continued)

*Primary Examiner* — Monzer R Chorbaji
(74) *Attorney, Agent, or Firm* — Leason Ellis LLP

(57) ABSTRACT

A system and method for delivering volatile corrosion inhibitor (VCI) for protecting against external corrosion to the bottom, soil-side, surface of a storage tank is disclosed. The VCI delivery system can include a transport material buried underneath the tank and a carrier structure for containing the transport material. VCI can be supplied to the transport material from an external VCI storage tank and the supply regulated by a control valve. The transport material is configured to adaptively and controllably release VCI into the soil in response an external stimulus. The transport material can passively adjust the VCI release rate as a function of a stimulus including pH or soil potential. Additionally, a control system can monitor soil conditions and generate the stimulus that triggers the release of the VCI. Also disclosed are systems and methods for deploying the VCI delivery system under the tank using horizontal drilling techniques.

15 Claims, 5 Drawing Sheets

(51) Int. Cl.
*B09C 1/08* (2006.01)
*B65D 90/22* (2006.01)
*C09K 3/00* (2006.01)
*C23F 11/08* (2006.01)

(58) Field of Classification Search
USPC .................. 422/7, 9–10; 252/390; 204/196; 134/11, 18, 22.1, 25.4, 25.5; 13/11, 18, 13/22.1, 25.4, 25.5
See application file for complete search history.

(56) References Cited

U.S. PATENT DOCUMENTS

| | | | |
|---|---|---|---|
| 5,172,584 | A | 12/1992 | Thomas |
| 5,340,455 | A * | 8/1994 | Kroon ..................... C23F 13/10 204/196.36 |
| 5,855,975 | A | 1/1999 | Miksic et al. |
| 7,270,775 | B2 * | 9/2007 | Kubik .................... B65D 79/02 252/389.52 |
| 7,874,764 | B2 | 1/2011 | Fossen et al. |
| 8,865,309 | B2 | 10/2014 | Setlur et al. |
| 8,881,904 | B2 | 11/2014 | Amy |
| 9,169,720 | B2 * | 10/2015 | Lyublinski ............. E21B 41/02 |
| 9,556,635 | B2 | 1/2017 | Lyublinski et al. |
| 2015/0108148 | A1 | 4/2015 | Lyublinski et al. |

FOREIGN PATENT DOCUMENTS

| | | |
|---|---|---|
| WO | 2008124058 A1 | 10/2008 |
| WO | WO-2018057617 A1 * | 3/2018 .............. C23F 11/00 |

OTHER PUBLICATIONS

Meroufel, A et al., "Mitigation of Soil-Side Corrosion on Storage Tank Bottoms in the Absence or Deficient of CP System." 16th Middle East Corrosion Conference, paper No. MECCFEB16-7995 (Manama: NACE, 2016). 2010.

Lyublinski, Efim, et al. "Corrosion protection of soil side bottoms of aboveground storage tanks." CORROSION 2014. OnePetro, 2014.

S. Rials et al., "Evaluation of corrosion prevention methods for above ground storage tank bottoms." Materials Performance;(United States) 32.1 (1993).

Fiaud, C. "Theory and practice of vapour phase inhibitors." The Institute of Materials, Corrosion Inhibitors(UK), 1994, (1994): 1-11.

Vasanth, K,. Vapor Phase Corrosion Inhibitors. ASM Handbook vol. 13A, Fundamentals, Testing and Protection. USA: American Society of Metals International (ASM). 871-877 (2003).

Office Action in corresponding Saudi Arabian Application No. 122431212, dated Dec. 28, 2022; 9 pages.

* cited by examiner

SYSTEM AND METHOD FOR DEPLOYING VOLATILE CORROSION INHIBITOR TO PROTECT AGAINST SOIL SIDE CORROSION AT THE BOTTOM OF A STORAGE TANK

FIELD OF THE DISCLOSURE

The present disclosure relates to corrosion protection, and more particularly to systems for corrosion protection of the bottom, soil-side, surface of storage tanks using volatile corrosion inhibitors.

BACKGROUND OF THE DISCLOSURE

Infrastructure corrosion is a significant problem faced by the oil and gas industry. Structures such as storage tanks are subject to corrosion over time due to the accumulation of moisture and to exposure to the hydrocarbon flows which they carry. Typically, this problem has been addressed by periodic inspections of infrastructure installations by field personnel. This process is time consuming in that it requires the structures to be placed offline, and for coverings and insulation on the structures to be removed to inspect the underlying metallic components.

In addition, since infrastructure installations are so large and widespread, only a fraction of the structures can be manually inspected in this manner at any one time. A particularly difficult surface of a storage tank to protect from corrosion and repair if necessary is the bottom, "soil-side," surface that rests on the ground.

It is with respect to these and other considerations that the disclosure made herein is presented.

SUMMARY OF THE DISCLOSURE

According to an aspect of the present disclosure, a system for delivering volatile corrosion inhibitor (VCI) to a soil-side bottom wall of a storage tank for protecting against soil-side corrosion of the bottom wall is disclosed. The system comprises an elongate carrier structure disposed within a delivery channel and extending horizontally through the soil beneath the bottom wall of the storage tank. The system also comprises a transport material provided within a hollow interior of the carrier. In particular, the transport material contains the VCI and is configured to adaptively release the VCI into the ground as a function of an external stimulus According to a further aspect, a method for delivering volatile corrosion inhibitor (VCI) to a soil-side bottom wall of a storage tank for protecting against soil-side corrosion of the bottom wall is provided. The method comprises the step of providing a VCI delivery system into the soil beneath the bottom wall of the storage tank. The VCI delivery system includes a carrier structure, which is a hollow elongate structure having a length and which is disposed in an elongate delivery channel extending horizontally through the soil beneath the bottom wall of the storage tank. The VCI delivery system also includes a transport material provided within the carrier structure. The transport material contains the VCI and is configured to release the VCI into the ground as a function of an external stimulus. The VCI delivery system further comprises a monitoring system including a control computing device and one or more sensors that are operatively connected to the control computing device. In particular, a first sensor among the one or more sensors is provided underground and is configured to measure a parameter indicative of corrosion from the soil. Additionally, the control computing device is configured to monitor the measured parameter. The method further comprises the step of selectively and controllably releasing, using the transport material, VCI into the soil as a function of the external stimulus.

These and other aspects, features, and advantages can be appreciated from the accompanying description of certain embodiments of the invention and the accompanying drawing figures and claims.

BRIEF DESCRIPTION OF THE DRAWING FIGURES

DESCRIPTION OF CERTAIN EMBODIMENTS OF THE DISCLOSURE

Figure 1A:
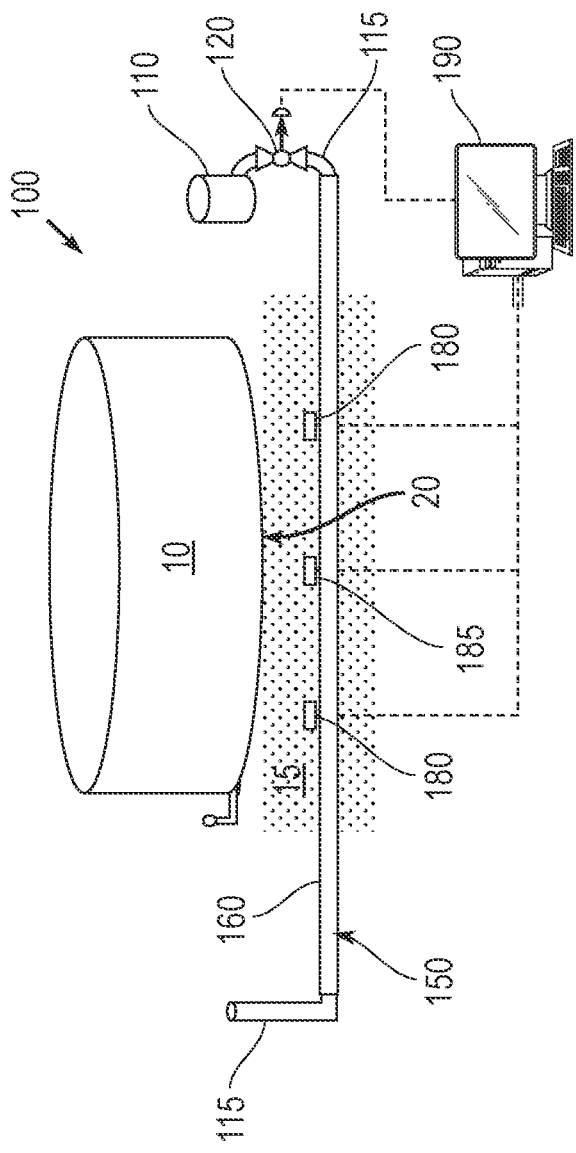
FIG. 1A is a conceptual side-elevation perspective view diagram a volatile corrosion inhibitor (VCI) delivery system for protecting against solid-side corrosion of a storage tank according to an embodiment.

By way of overview and introduction, disclosed herein are systems and methods for delivering volatile corrosion inhibitor (VCI) for protecting against external corrosion to the underside (i.e., soil-side) of the bottom of a storage tank. A further aspect of the disclosure is a system and method for installing the VCI delivery system under the tank using horizontal drilling techniques, which can be performed during tank operation and without halting tank operation.

Storage infrastructure used in the oil and gas industry can commonly comprise hundreds of storage tanks installed in multiple locations with different soil environments. Maintaining the tanks in operation by reducing the assets' unscheduled shutdowns is a priority for reliable operations. Improving maintenance programs is a significant contributor to enhance the useful life of the assets. Embodiments of the disclosure add an extra layer of protection to tank integrity programs. Appropriate protection can also extend the inspection intervals and optimize the inspection activities by maintaining adequate protection against corrosion on the tanks' soil side, thereby representing operational savings.

Embodiments of the present disclosure aim to mitigate and control the external corrosion at the soil side of the storage tanks. The typical corrosion protection utilized for this area is cathodic protection. However, sometimes the cathodic current does not reach the entire surface of the tank leading to localized corrosion. Embodiments of the present disclosure provide an additional or alternative layer of protection that can help to improve the tank integrity.

Embodiments of the disclosure implement an adaptable VCI delivery system capable of controlling the deployment of VCI to mitigate solid-side corrosion in storage tanks, thereby optimizing the protection of the asset and optimizing consumption of VCIs.

The VCI delivery system comprises a VCI storage tank, a flow control valve, a transport material for controllably deploying the VCI, and in some embodiments, a carrier structure for containing the transport material. The transport material can comprise a polymer material membrane that absorbs and controllably releases the VCI. The transport material can also comprise a polymer transport material with encapsulated VCI dispersed therein. The transport material is configured to release the VCI at a controlled rate and can be configured to adaptively adjust the amount of VCI that is released in response an external stimulus. The system thus provides an adaptable and controllable solution for delivering VCIs for soil-side corrosion mitigation in storage tanks. Furthermore, in accordance with one or more embodiments, the components of the VCI delivery system that are buried under the tank can be installed using horizontal drilling technology.

The delivery of the VCI to reach the desired level of protection is an important parameter controlled using the system. If VCIs are injected without proper measurements of the soil conditions indicative of corrosion and/or VCI concentration, it could result in high consumption of VCIs, which will not offer the desired protection or efficiency. An adequate release of the VCI is important to protect the bottom plate of the storage tank adequately. VCIs are preferably added to a specific range of concentrations to offer the best protection. The transport material enables adaptive control over the concentration of released VCI to achieve the desired level of protection. The transport material, which as further described herein can comprise a polymeric or silica material, is configured to control the VCI deployment over a long period of time.

The VCI delivery system is also designed to provide the ability to refill the underground delivery channel (e.g., the carrier tubing) with VCI allowing a continuous concentration of VCI in the system. Challenges relating to VCI delivery addressed by the systems and methods of the disclosure include 1) controlling the required amount of VCI to be injected in to the soil and the time and ability to refill the reservoir with a new batch of VCI; and 2) to maintain an appropriate concentration of VCI in the soil to avoid unnecessary consumption of materials.

In an embodiment, the VCI delivery system comprises a transport material configured to control the VCI concentration by adjusting the delivery rate of VCI as a function of a potential change. The optimization of the VCI delivery enables the system to efficiently control soil-side corrosion by reducing the over-consumption of VCIs. The system is also capable of injecting VCI into the surrounding soil while the tank is in operation and thereby reduces down time.

Figure 1B:
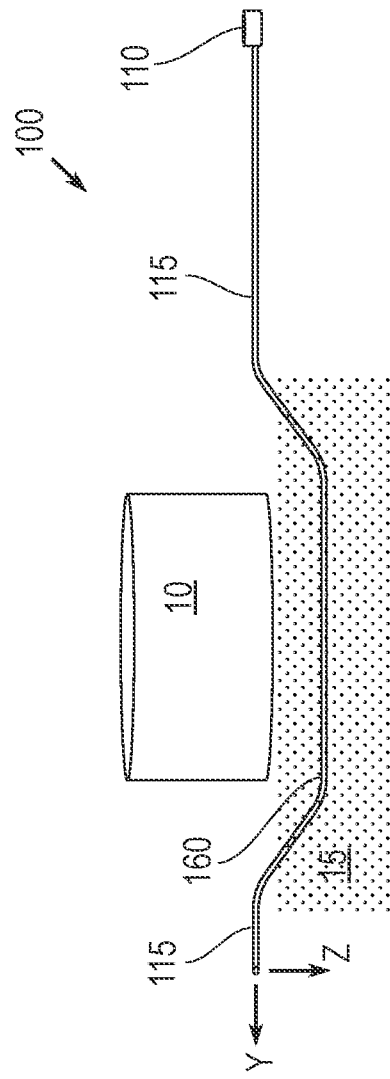
FIG. 1B is a simplified side-elevation view diagram of the VCI delivery system of FIG. 1A according to an embodiment.
Figure 1C:
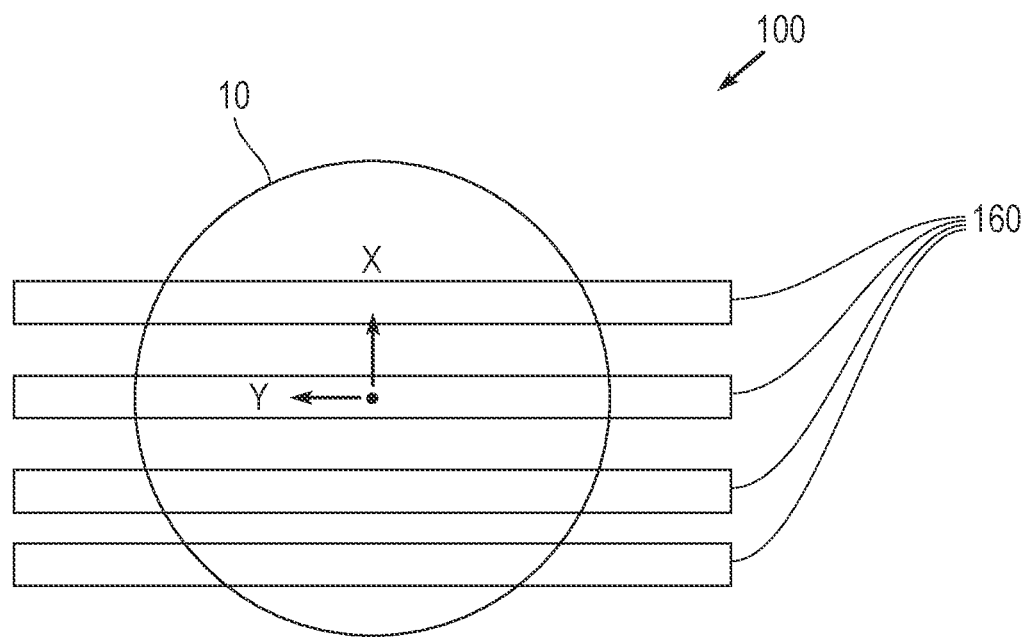
FIG. 1C is a simplified top-plan view diagram of select components of the VCI delivery system of FIG. 1A buried under a storage tank according to an embodiment.

FIG. 1A-1C illustrate an exemplary VCI delivery system 100 for controllably releasing VCIs underneath a storage tank to mitigate solid-side corrosion of the storage tank according to an embodiment. FIG. 1A is a conceptual perspective side-elevation view diagram of the VCI delivery system 100, shown buried under ground beneath the soil-side surface 20 of the storage tank 10. FIG. 1B is a side-elevation view diagram of the VCI delivery system 100. FIG. 1C provides a top-view diagram of the system 100 with only the footprint of the tank 10 shown.

The VCI delivery system 100 comprises a VCI storage container 110 for containing the VCI slurry intended to be delivered under the tank 10. The VCI storage container is in fluid communication, via a fluid conduit (e.g., pipe 115), with components of the system that are buried under the tank and configured for delivering (i.e., releasing) the VCI into the surrounding soil 15. The components of the system 100 intended to be buried in the ground 15 under the tank include a transport material 150 configured to absorb and store the VCI from the storage container, and controllably release the VCI into the ground 15. The transport material 150 can be referred to as a "smart" material in that the amount or rate of VCI that the material releases can vary in a controlled manner as a function of an environmental condition or an applied stimulus.

In an embodiment, and as shown in FIG. 1A, the transport material is contained within a carrier structure 160. The carrier is a pipe or tube having a hollow interior and perforations or holes provided through the outer wall (holes/perforations not shown), for example, a perforated PVC pipe. Alternatively, the transport material can be provided in a rigid form such that it is capable of being delivered underground directly using a horizontal drill system and can operate without containment within a carrier.

Additionally as shown in FIG. 1A, the flow of VCI from the storage container 110 into the transport material can be controlled or modulated by a flow control valve 120. The VCI slurry can be fed from the tank directly into the transport material in an amount that ensures the transport material is soaked with VCI while the transport material is actively releasing VCI into the surrounding soil. For instance, in an embodiment, the flow control valve can be periodically opened to deliver an amount of VCI slurry to the transport material membrane sufficient to replenish the amount of VCI delivered by the transport material into the soil. In addition or alternatively, the flow control valve can be adjusted to continuously feed VCI slurry to the transport material at a rate that is a function of the rate at which the transport material is releasing VCI into the soil. In addition or alternatively, in an embodiment, the transport material including VCI encapsulated therein can be delivered from an external container, such as the container 110, into the carrier 160 via an in-flow pipe 115. Similarly, excess or spent materials (e.g., the transport material and/or VCI slurry) can be collected from a pipe 115 connected to an opposite end of the carrier 160, as shown in FIGS. 1A-1B for example.

In an embodiment, the transport material 150 can be contained within one or more carriers 160 that extend under the bottom wall of the tank. For instance, as shown in FIG. 1C, the transport material can be housed within each of four carriers 160 that extend underneath the bottom of the tank 10, are arranged in parallel and preferably extend at least the entire width of the tank. In the alternative configuration in which a carrier is omitted, the carriers 160 shown in the FIGS. 1A-1C can be replaced with elongate lengths of transport material having a suitably rigid structure that enables insertion using horizontal drilling techniques and normal operation without protection from a carrier. Thus, it should be appreciated that rigid lengths of transport material can be disposed underneath the tank 10 in a similar configuration as the carriers shown in FIGS. 1A-1C.

Although not shown in FIG. 1C, it should be understood that a pipe 115 (FIG. 1A-1B) for supplying materials including the VCI underneath the tank can be connected to a first end of each of the carriers 160. A pipe 115 can similarly be connected to the opposite end of the carriers 160, for instance, to allow the materials including VCI to flow into or out of the carriers from the opposite end, say, during soaking of the transport material.

Figure 1D:
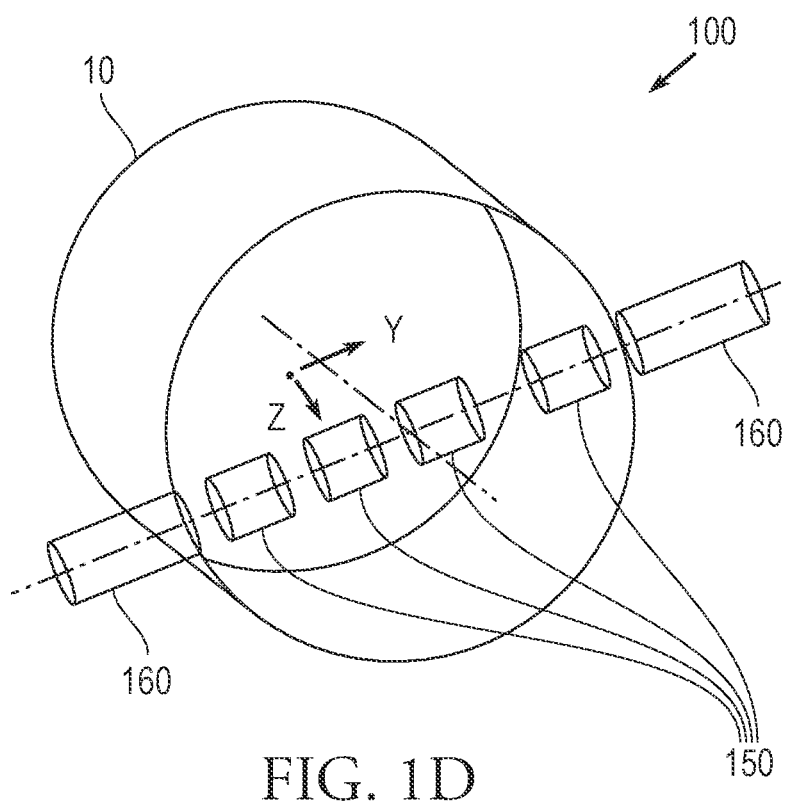
FIG. 1D is a simplified top-perspective view diagram of select components of the VCI delivery system of FIG. 1A buried under a storage tank according to an embodiment.

FIG. 1D is a simplified perspective top view of the system 100, showing only a single carrier 160 underneath the tank and further illustrating an exemplary configuration of the transport material 150 within the carrier 160 according to an embodiment. FIG. 1D omits the portion of the carrier 160 extending underneath the tank 10 to more clearly show the exemplary configuration of the transport material 150 arranged therein. As shown in FIG. 1D, in an embodiment, the transport material within the carrier 160 comprises a plurality of sections of transport material that are spaced apart underneath the bottom of the container in the lengthwise (e.g., axial) direction of the carrier. In addition or alternatively, one or more elongate lengths of transport material can extend greater lengths through each carrier. For instance, a length of transport material that extends the entire width of the tank can be provided.

The transport material 150 is preferably capable of absorbing the VCI within its material structure and controllably releasing the VCI through the outer surface of the transport material and, thus, delivering it into the ground 15 under the tank 10 at a controllable delivery rate (also referred to as a diffusion rate or release rate). Once released, the VCIs move through the perforations (not shown) in the carrier 160 and the ground 15 toward the tank bottom. In particular, VCIs are commonly designed to have a particular charge (usually positive) and are electrostatically attracted to the opposite charge of the tank's steel soil-side wall. As a result, the VCIs move through the ground toward the soil-side surface of the tank and form a film on the surface to hinder corrosion.

The transport material 150 is preferably configured to contain an amount of VCI that enables the transport material to controllably release VCI under the tank over an extended period of time (e.g., over a period on the order of days, weeks, months, or years).

In an embodiment, and as shown in FIG. 1A, the system 100 can further comprise a monitoring system for monitoring soil conditions indicative of possible corrosion of the tank bottom, monitoring the condition of the transport material and its operation, determining the concentration of VCI to be released to the environment, and in some cases activating the transport material to control VCI delivery rate. In particular, the monitoring system can comprise one or more sensors 180 provided in the transport material 150 and/or along the inner or outer surface of the carrier 160 and configured to measure parameters indicative of the state of the transport material 150, environmental conditions of the ground that are indicative of corrosion of the tank bottom 20 (e.g., soil potential), and/or the concentration of VCI in the ground. In some embodiments, the sensors 180 can be coupled to one or more control circuits programmed (or otherwise configured) to operate the sensors and monitor the various measurements captured using the sensors to infer useful information on the corrosion of the bottom wall 20, the amount of VCI within the ground 15, the diffusion rate of the VCI from the transport material 150 and other such parameters.

The foregoing operations and other computer-controlled operations disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a single board computer (SBC), a workstation, a tablet, a transportphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the control operations (or other disclosed method) to be carried out. It should be noted that in other embodiments, the order of the operations can be varied, and that some of the operations can be omitted. Some or all of the control operations (or other disclosed methods) can also be performed using logic, circuits, or processors located on or in electrical communication with the system 100.

For ease of discussion, in an exemplary embodiment and as shown in FIG. 1A, the system 100 comprises an external control computing system 190 that is directly or indirectly communicatively coupled to the sensors 180 (e.g., via a data communication communications connection) and that is configured to receive and analyze the information obtained using respective sensors to monitor and control operation of the system and otherwise implement various other features and functions of the system 100. In this regard, the control computing system 190 can be operatively connected to one or more devices of the system 100 and configured to control their operation for the purpose of monitoring and implementing corrosion prevention measures. For instance, the control computing system 190 can be configured to control the composition of the transport material delivered underground, control the valve 120 to adjust the flow rate of VCI from the container 110 into the carrier 160 and transport material 150 therein. By way of further example, as further descried herein, the control computing system 190 can be configured to actively control the release rate of VCI from the transport material 150.

In an embodiment, the transport material can have a solid form, for instance, be composed of a relatively rigid or hard material (e.g., a solid polymer). The transport material, however, can be a softer solid material (e.g., a softer and more pliable polymer material). In addition or alternatively, the transport material 150 can be in a liquid form (e.g., a semi-viscous or viscous polymer based solution). Preferably transport materials in a liquid form have a viscosity that allows it to fill the carrier without flowing into the surrounding soil through the perforations in the carrier, allows the transport material to be delivered into the carrier and allows the transport material to be evacuated from the carrier. In addition or alternatively, the transport material can have one or more of a plurality of physical states. For instance, the transport material can be deployed underground in a heated liquid form and subsequently solidified.

In an embodiment, the transport material 150 comprises one or more of a porous silica material, and a polymer material membrane that are configured to absorb and controllably release the VCI. The polymer membrane material can include, for example, polyurethane (PUR), polystyrene (PS), polyvinylchloride (PVC), polyethylene (PE) in one or more of various forms (e.g., cellular foam, films, etc.).

In an embodiment, the transport material 150 can comprise a polymer gel. The polymer gel can be formed of various polymers and can be a water soluble-component. For instance, the polymer gel can comprise poly vinyl alcohol (PVA), poly acrylic acid (PAA), poly acrylonitrile (PAN), and the like.

Micro-carriers configured to contain the VCI and actively release the VCI can be suspended within the polymer gel. Once the VCI's are freed from the solution (e.g., through breakage of the microcarrier's outer wall or opening of its pores) the VCI will travel upwards toward the tank bottom, thereby offering protection to the carbon steel tank bottom.

Accordingly, in an embodiment, the carrier 160 can be filled with a transport material solution comprising the gel and a suitable dispersion of microcarriers suspended therein. A suitable dispersion is one that has a homogenous concentration density of microcarriers throughout the polymeric water-soluble gel. In an embodiment, the transport material solution can be pre-mixed, say within the external container 110, before introducing the solution into the carrier 160.

A suitable dispersion of microcarriers in the gel can be a function of a concentration of the microcarriers. A suitable dispersion of microcarriers can also be a function of the amount of VCI contained within the carriers and thus VCI concentration of VCI in the gel. Accordingly, in an embodiment, a concentration of the microcarriers can be measured and monitored inside the carrier 160. Furthermore, the concentration of suspended microcarriers within the gel can be actively adjusted as a function of measured parameters relating to corrosion (e.g., soil potential) and/or corrosion prevention. For instance, in the event that soil potential readings indicate higher than expected levels of corrosion, or in the event that VCI concentration readings in the soil indicate that insufficient amounts of VCI are being released, the microcapsule concentration in the gel can be increased by supplying more gel with a higher microcapsule/particle concentration into the carrier 160.

The microcarriers can be, for example, microcapsules, microparticles or a combination of the foregoing. The microcarriers can have a size that is on the order of one, ten, hundreds, or thousands of microns, or larger. Microencapsulation is a versatile method as it allows for encapsulating various types of components, including VCI.

In an embodiment, the microcarriers can comprise a microcapsule shell wall that is prepared by a polymerization process using, for instance, melamine and formaldehyde with an organic acid as a catalyzer. The microcapsules can have a soft wall. However, depending on the soil type and soil medium of the intended application, the mechanical properties of the microcapsules (e.g., shell hardness) can be adapted accordingly.

In an embodiment, the gel includes dispersed silica oxides suitable for selectively releasing the VCI at a controllable diffusion rate. For example, $SiO_2$ particles can be in the form of a capsule that encapsulates the VCI and that is configured to selectively break. By way of a further example, the $SiO_2$ particles can be in the form of a middle porous capsule that absorbs the VCI and selectively releases the VCI. For instance, the silica oxides can comprise an $SiO_2$ particle with a core-shell and having a prescribed porosity that allows the VCI contained therein to be released in a controllable manner. Additionally, the porosity of the $SiO_2$ particles can be prescribed to define the concentration (or release rate) of the VCI released from the particle. In an embodiment, such particles can be configured selectively release the VCI as a result of a pH change. In an embodiment, such particles can be configured selectively release the VCI as a result of activation by other chemicals such as chloride in the ground.

In addition or alternatively to the transport material 150 comprising a polymer gel medium, in an embodiment, $SiO_2$ can be utilized as the transport material within which microcapsules/particles containing VCI are added. In an embodiment, the VCI can be encapsulated or absorbed into a transport material comprising one or more of cyclodextrin, mesoporous silica and nanotubes. The VCI can be also added into one or more of polyelectrolyte or a copolymer vesicle, or a hybrid sol-gel coating.

As noted, the microcapsules/particles of the transport material 150 can be configured to break or otherwise release VCI as a result of one or more of a variety of external forces or conditions. The external stimulus can be passively occurring (e.g., as a result of tank corrosion), or actively induced by a control system.

For instance, in an embodiment, the walls of the microcapsules can be configured to degrade and release VCI due to a chemical condition. More specifically, as corrosion of the tank bottom can cause a change in the pH of the surrounding soil (e.g., an increase in soil pH), in an embodiment, the microcapsules can be configured to degrade and break when the pH of the capsule reaches a prescribed level (e.g., exceeds a threshold level). Similarly, in an embodiment, the gel can be a material that is sensitive to pH and configured to chemically activate dissolution of the shell of the microcapsule when the pH reaches a prescribed level.

Corrosion is an electrochemical process in nature that causes soil-potential changes as well. Accordingly, in an embodiment, the microcapsules/particles can be sensitive to the potential of the surrounding soil and configured to break in response to changes in potential.

In an embodiment, the ground potential and/or the current associated with the corrosive system change, can be actively monitored using the monitoring system comprising the sensors 180 and the control computing system 190. In particular, the control computing system 190 can be configured to monitor ground potential and/or current measurements taken using sensors 180 and detect out of specification measurements that are indicative of corrosion. Accordingly, in response to detecting an event, the control computing system can apply a stimulus to the transport material 150 that serves to activate or break microcapsules within the carrier.

Figure 2:
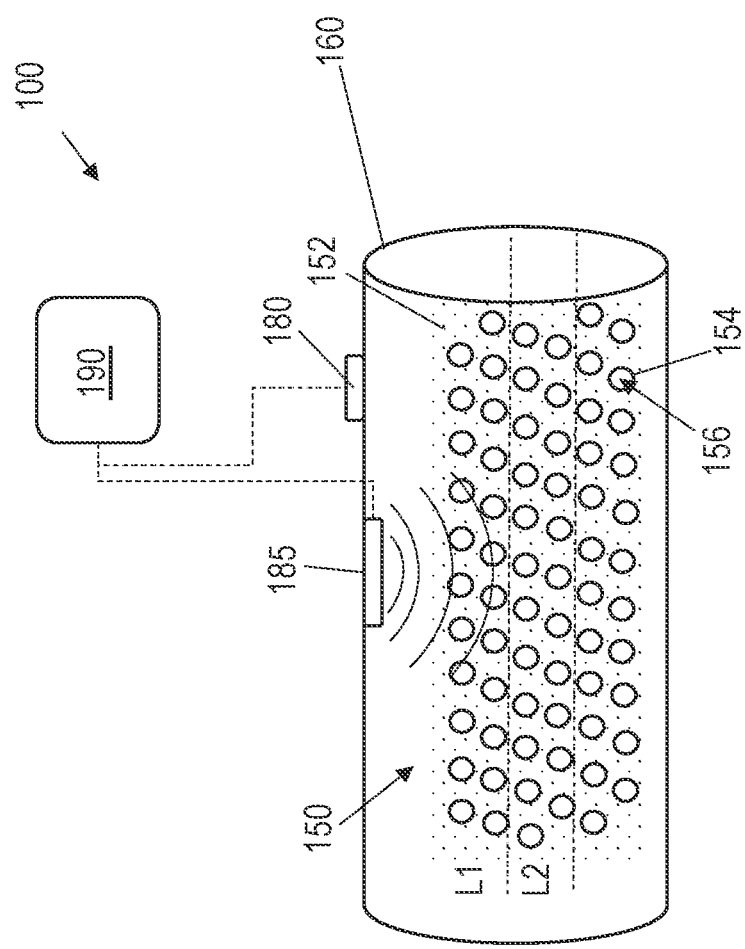
FIG. 2 is a side-view diagram illustrating a section of a carrier and transport material of the VCI delivery system of FIG. 1A according to an embodiment.

For instance, FIG. 2 (not drawn to scale) is a side-view of a section of an exemplary configuration of a carrier 160 of the system 100 in accordance with an embodiment. In this example arrangement, the carrier 160 contains the transport material 150 comprising a polymer gel 152 including dispersed microcapsules 154 containing VCI 156. Also shown is a sensor 180 connected to the control computing system 190 and configured to measure one or more parameters indicative of corrosion. For example, the sensor 180 can comprise a copper-copper sulfate electrode that is exposed on the exterior surface of the carrier 160 and configured to measure the potential of the soil in contact with the surface of the electrode. The control computing system 190 can be configured to compare the present soil potential measurement to a minimum/baseline potential, which can be measured from the soil in the absence of a corrosion condition, and detect a corrosion condition/event if the present potential is inconsistent with the baseline. VCI concentration in the ground and/or in the transport material can be measured indirectly by monitoring corrosion using, for example, corrosion coupons. Moreover, VCI concentration can be measured indirectly using corrosion probes or acoustic emission sensors to monitor corrosion. Additionally, VCI concentration could be monitored directly based on mass/weight measured using a frequency reader, such as, a quartz crystal micro-balance.

In response to detecting the corrosion event, the control computing system 190 can trigger the activation of the transport material by generating an appropriate stimulus such as an electrical pulse that is suitable for selectively activating some of the microcapsules. For instance, as shown in FIG. 2, one or more voltage pulse emitters 185 can be provided at one or more locations along the inner surface of the carrier 160, say, near the top end. The control computing system 190 can be configured to cause the voltage pulse emitter 185 to generate an electrical pulse that is suitable to break a top layer L1 of the microcapsules 154, thereby causing the VCI 156 therein to be released. Once the VCI from the first layer is deployed, if a subsequent event is detected, a further pulse can be generated to activate the second layer L2 of microcapsules 154 to deliver another dose of VCI, and so on.

In an embodiment, the electrical pulse can be a voltage pulse or a current pulse. The voltage pulse can be a DC or an AC electrical signal. In an embodiment, one or more parameters of the applied signal (e.g., magnitude or frequency) can be adjusted to control the number of microcapsules that are activated based on the electrical properties of the transport material, for example, the impedance of the transport material. In an embodiment, the pulse emitter can comprise multiple pulse emitting cables that are extended along the carrier 160 at respective heights in the vertical direction and are thus arranged for activating respective layers of capsules within the carrier. In an embodiment, the pulse emitter can be a current pulse generator circuit that is configured to generate a pulse in the form of a current discharge that has a current amplitude and pulse width that is sufficient to be conducted through at least a surrounding volume of transport material and that breaks the microcapsules of the transport material in the surrounding volume. In an embodiment, the pulse emitter can generate a train of pulses.

In response to detecting the corrosion event, the control computing system 190 can also generate an alert indicating the detection of an event. The alert can also include measured parameters and other such information relating to the detected event. For instance, the alert can be output through one or more user interfaces such as an audio or visual output device. By way of further example, the alert can comprise an electronic message that is transmitted to an operator via a communication interface of the control computing system 190. It should be understood that information relating to the operation of the system 100 can be similarly output by the control computing system 190 even in the absence of a detected event.

According to a further aspect, a system and process for deploying the VCI delivery system in situ uses horizontal drilling technology is disclosed. The horizontal drilling systems and methods are capable of positioning the transport material in an appropriate position relative to the bottom of the tank while the tank is in operation and without requiring tank downtime.

Figure 3:
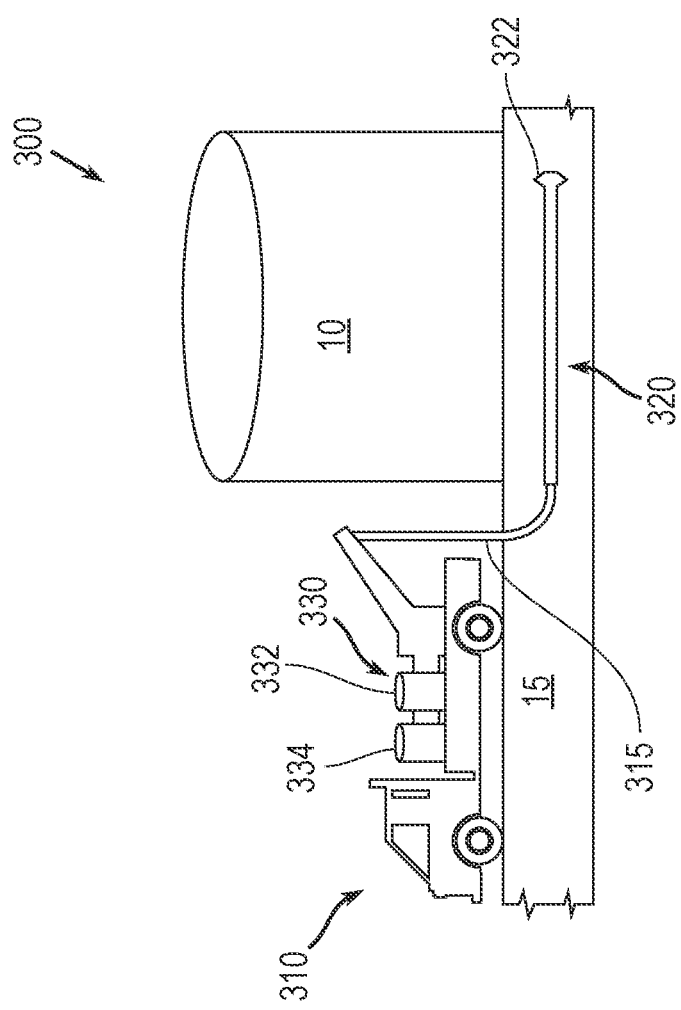
FIG. 3 is a simplified side-elevation view diagram of a system for deploying a VCI delivery system underground beneath the bottom of a storage tank according to an embodiment.

FIG. 3 provides a simplified side elevation view of the system 300 for deploying the VCI delivery system (e.g., system 100) beneath a tank 10 using horizontal drilling techniques. As shown, the deployment system 300 can be provided on a mobile deployment vehicle 310, which can be moved into position on the surface of the ground 15 next to the side of tank 10.

The deployment vehicle includes a horizontal drilling system 320. As would be understood by those in the art, the horizontal drilling system comprises a drill bit 322 and other components commonly found on conventional drilling systems for boring a horizontally through the ground to create an elongate hole or void in the ground.

In an embodiment, the horizontal drilling system 320 is used to bore horizontally through the ground 15 under the bottom tank 10 to provide one or more delivery channels that extends linearly across the entire footprint of the tank. Multiple delivery channels can be bored and spaced apart in a lateral direction, which is perpendicular to the lengthwise direction. The lateral spacing of the delivery channels, and the respective lengths of the delivery channels can be defined to ensure that the VCI released from within the delivery channels forms a uniform coating on the soil-side surface of bottom wall of the tank. The delivery channels also preferably have a cross-sectional area (e.g., diameter, width and/or height) that is suitable for delivering the carrier 160 (as shown in FIGS. 1A-2) and/or transport material 150 into position under the tank 10.

While a conventional horizontal drilling apparatus can be used to drill the delivery channel and insert segments of pipe (e.g., carrier 160) under tank 10, according to a salient aspect, the horizontal drilling system 320 of one or more of the disclosed embodiments is integrated with a lateral injection system configured to deliver the transport material of into place within the delivery channel or carrier therein.

In an embodiment, the injection system comprises a polymer melting and injection unit 330, which can comprise a polymer tank 332 for containing and heating the polymer used in the transport material 150 such that it is a liquid material capable of being injected into the horizontal hole. The injection unit 330 can also comprise a compressed air tank 334. The injection unit is configured to use the compressed air to propel or "inject" the liquid polymer transport material into the underground channel and and/or any carrier disposed therein via a conduit 315 (e.g., pipe or hose).

Figure 4:
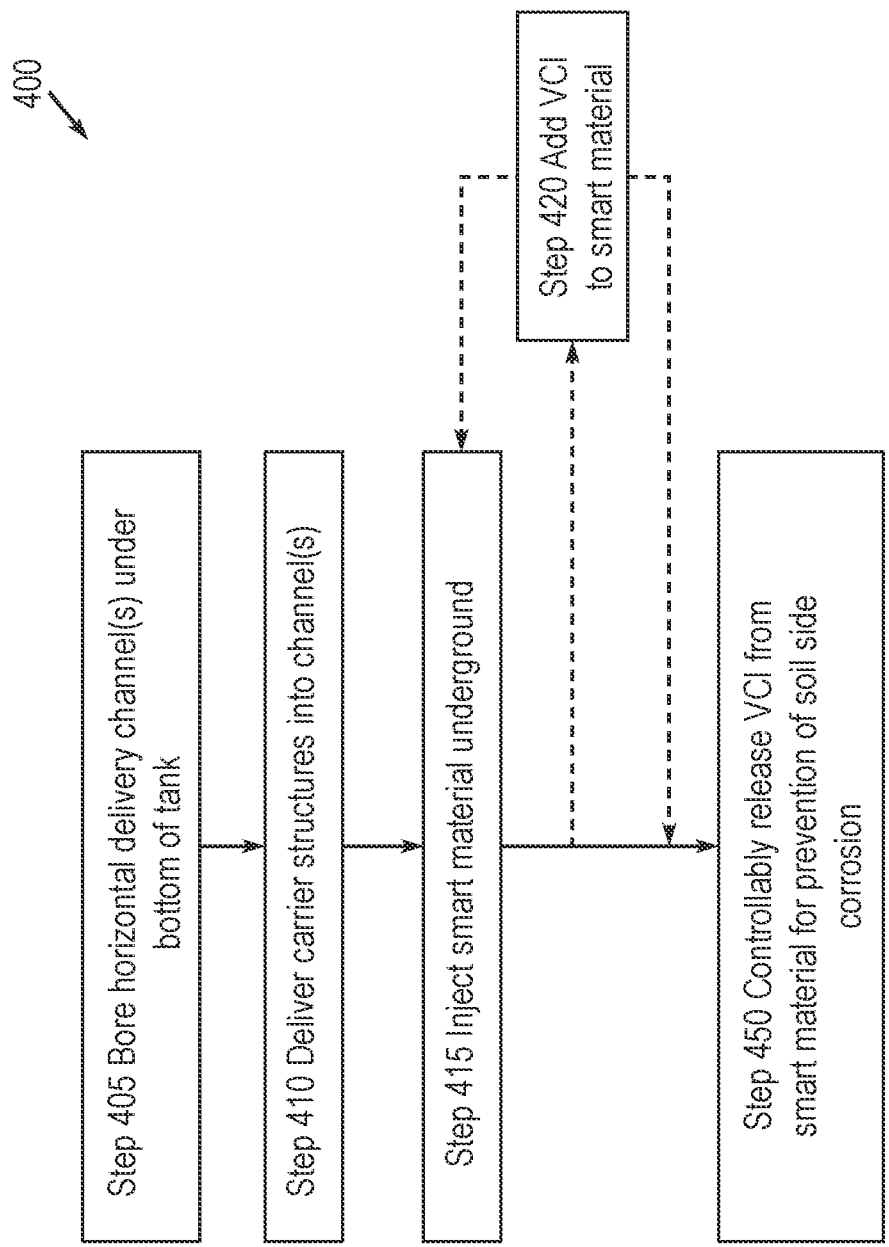
FIG. 4 is a process flow diagram illustrating a method for deploying a VCI delivery system for protecting against solid-side corrosion of a storage tank according to an embodiment.

FIG. 4 is a process flow diagram illustrating an exemplary process 400 for installing the VCI delivery system under the tank 10 using the deployment system 300 according to an embodiment. At step 405, one or more delivery channels are bored horizontally under the tank using the horizontal drilling system 320. At step 410, any carrier structures, such as a perforated PVC pipe, are delivered into the one or more delivery channels. At step 415, the liquid polymer transport material 150 is injected into the channel (or carrier) using the injection unit 330 and via the conduit 315 until the channel or carrier is filled with a prescribed amount of liquid polymer transport material. The step for injecting liquid transport material can be followed by cooling of the material that, depending on the composition of the polymer material, can cause the material to set (e.g., harden).

In some embodiments, the process 400 can also include a step for providing the VCI to the transport material 150. For instance, in an embodiment, after the transport material is deployed using the system 300, at step 420, a VCI slurry can be supplied from an external container (e.g., container 110) to the transport material such that the VCI can be absorbed into the transport material and subsequently released. In addition or alternatively, the VCI can be mixed into the transport material before it is delivered underground. For instance, the injection unit 330 can include a supply tank (not shown) of VCI or microcapsules/particles for mixing with the liquefied polymer base prior to injection of the transport material mixture underground.

Upon completion of installation, at step 450, the system 100 can be put into operation for preventing soil side corrosion of the tank bottom in accordance with the various examples and embodiments discussed above. It should also be understood that one or more of the steps of routine 400, among other maintenance and control operations described above, can be performed during operation of the system 100 including, for example, a periodic resupply of transport material and/or VCI into the underground system.

It should be understood that various combination, alternatives and modifications of the disclosed embodiments could be devised by those skilled in the art. The present invention is intended to embrace all such alternatives, modifications and variances that fall within the scope of the appended claims.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for delivering volatile corrosion inhibitor (VCI) to a soil-side bottom wall of a storage tank for protecting against soil-side corrosion of the bottom wall, comprising:
   an elongate carrier structure disposed within a delivery channel and extending horizontally through the soil beneath the bottom wall of the storage tank,
   a transport material provided within a hollow interior of the carrier, wherein the transport material contains the VCI and is configured to adaptively release the VCI into the ground as a function of an external stimulus, wherein the transport material is configured to controllably release the VCI at a release rate, wherein the release rate of the transport material varies passively as a function of the stimulus.

2. The system of claim 1, the carrier comprising a pipe having an outer wall with voids or perforations therethrough for allowing VCI released from the transport material to pass through the carrier and into the soil.

3. The system of claim 1, wherein the stimulus is one or more of, a pH and an electrical potential.

4. The system of claim 3, wherein the transport material is selected from the group consisting of: a polymer material membrane, and a porous silica oxide.

5. The system of claim 1, wherein the transport material comprises: a water-soluble polymer gel and microcarriers dispersed throughout the gel, wherein the microcarriers are configured to contain the VCI and are configured to selectively release the VCI as a function of the stimulus.

6. The system of claim 5, wherein the microcarriers comprise one or more of microcapsules and microparticles.

7. The system of claim 5, wherein the microcarriers comprise one or more of an outer shell configured to encapsulate the VCI and selectively break in response to the stimulus, and a porous shell configured to absorb the VCI and selectively release the VCI through the porous shell in response to the stimulus.

8. The system of claim 7, wherein the stimulus is one or more of:
   a soil potential;
   a pH;
   and an electrical pulse.

9. The system of claim 1, further comprising:
   a monitoring system including:
      a control computing device,
      one or more sensors operatively connected to the control computing device, wherein a first sensor among the one or more sensors is provided underground and is configured to measure a parameter indicative of corrosion, and
      wherein the control computing device is configured to monitor the measured parameter and detect a corrosion event from the measured parameter.

10. The system of claim 9, wherein the parameter is one or more of:
    an electrical potential of the soil,
    a current through the soil, and
    a pH of the soil.

11. The system of claim 10, wherein the sensor is a copper-copper sulfate electrode that is configured to measure the electrical potential of the soil.

12. The system of claim 9, wherein a second sensor among the one or more sensors is configured to measure a concentration of VCI present in one or more of the soil and the transport material.

13. The system of claim 12, further comprising:
    an external VCI storage system for supplying VCI to the transport material within the carrier, including:
       an above-ground container for storing fluid contents including VCI,
       a fluid conduit configured to provide fluid communication between the container and the carrier, and
       a valve configured to control a flow of VCI from the container to the carrier; and
    wherein the control computing device is in operative communication with the valve and configured to adjust the valve to control the flow as a function of the measured concentration of VCI.

14. The system of claim 9, wherein the monitoring system further comprises:
    a pulse emitter in operative communication with the control computing device, wherein the pulse emitter is configured to output the stimulus in the form of an electrical pulse to at least a portion of the transport material and thereby causing the at least the portion of the transport material to release VCI.

15. The system of claim 14, the pulse emitter comprising:
    a plurality of pulse emitting cables extended along the carrier at respective heights in a vertical direction, wherein the pulse emitting cables are configured to activate respective portions of the transport material thereby causing the respective portions to release VCI contained therein.

* * * * *